(12) United States Patent
Chen et al.

(10) Patent No.: US 8,984,459 B2
(45) Date of Patent: Mar. 17, 2015

(54) METHODS AND APPARATUS FOR LAYOUT VERIFICATION

(75) Inventors: Shin-Huang Chen, Puli Town (TW); Yin-Chuan Chen, Taichung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 148 days.

(21) Appl. No.: 13/464,417

(22) Filed: May 4, 2012

(65) Prior Publication Data
US 2013/0298094 A1 Nov. 7, 2013

(51) Int. Cl.
*G06F 9/455* (2006.01)
*G06F 17/50* (2006.01)

(52) U.S. Cl.
USPC ............. 716/112; 716/52; 716/106; 716/107; 716/111

(58) Field of Classification Search
USPC ....................... 716/106–112, 136, 139, 50–56
See application file for complete search history.

(56) References Cited

U.S. PATENT DOCUMENTS

| | | | | |
|---|---|---|---|---|
| 7,818,707 | B1 * | 10/2010 | Gennari et al. | 716/53 |
| 8,341,571 | B1 * | 12/2012 | Lei et al. | 716/107 |
| 2004/0003357 | A1 * | 1/2004 | Palusinski et al. | 716/5 |
| 2008/0235497 | A1 * | 9/2008 | Tomblin et al. | 712/225 |
| 2011/0041110 | A1 * | 2/2011 | Zavadsky et al. | 716/112 |
| 2011/0239168 | A1 * | 9/2011 | Lei et al. | 716/51 |
| 2013/0024827 | A1 * | 1/2013 | McIlrath | 716/103 |
| 2013/0198712 | A1 * | 8/2013 | Koranne et al. | 716/119 |

OTHER PUBLICATIONS

"Calibre Interactive," Mentor Graphics, retrieved Oct. 4, 2012 from http://www.mentor.com/products/ic_nanometer_design/verification-signoff/physical-verification/calibre-interactive/upload/CI_datasheet.pdf , 2 pages.
"Hercules DRC and LVS; Technology-Leading Physical Verification Solution for 45nm and Above," Retrieved Oct. 4, 2012 from http://www.synopsys.com/tools/implementation/physicalverification/pages/hercules.aspx, 2 pages.

* cited by examiner

*Primary Examiner* — Nha Nguyen
(74) *Attorney, Agent, or Firm* — Slater & Matsil, L.L.P.

(57) ABSTRACT

Methods and apparatus of performing layout-versus-layout (LVL) comparison are disclosed. A layout may be in various formats such as GDSII or OASIS, for different circuits, and represented by a basic layout element, a hierarchical cell or a plurality of independent cells in various layers. A basic layout element, a hierarchical cell, and a layout with a plurality of independent cells may have a signature generated according to the embodiment methods. The signature of a basic layout element may be generated based on values of a center and a circumference, and a hashed trace value generated by a hash function of a trace of the basic layout element. The signature of a hierarchical cell can be generated recursively. A signature of a first layout may be compared to a signature of a second layout to determine whether the first layout matches the second layout.

20 Claims, 4 Drawing Sheets

A - enter vector(x=-5, y=+4)

A_signature = circumference (16) * (-5)*(+4)* CRC32 checksum of(-82-22-26-86) = 16 * (-5)*(+4)* 57505767 = -18401845440.

B –center vector(x=+7,y=+4)

B_signature = circumference (28) * (+7)*(+4)*CRC32 checksum of(2212212626) = 28 * (+7)*(+4)*542312406= 425172926304.

C –center vector (x=-2, y=-6)

C_signature = circumference (16) *( -2 )*(-6)*CRC32 checksum of (-8-8-8-2-4-2-2-6-2-8) = -20420123434.

D - center vector (x=7, y=-6)

D_signature = circumference (2*3.141596*5)* 7*(-6)*CRC checksuum(7-6) =2512211634147.87384.

SUM OF SIGNATURES OF ALL COMPONENT CELLS
= (A_ signature + B_ signature + C_ signature + D_ signature)

METHODS AND APPARATUS FOR LAYOUT VERIFICATION

BACKGROUND

Semiconductor Integrated Circuits (IC) are increasingly more complex with millions of devices such as transistors connected together to perform intended functions. An IC may be created by a design process performed by a design house, followed by a fabrication process performed by a dedicated fab company.

An IC design process may start with a software description, e.g., in a programming language such as C or VHDL, of the functionality of the circuit, which is then synthesized to interconnected gate-level hardware elements. Next the hardware elements and their connections are physically laid out, represented as placements of geometric shapes, often referred to as a layout, on a variety of layers to be fabricated on the semiconductor device. Afterwards, the IC design together with the description of the IC layout, is transferred to an IC fabrication facility for fabrication.

IC layouts may be created by a computer aided design (CAD) tool or an electronic design automation (EDA) tool and stored in a database, and may undergo a number of modifications before the final fabrication. For example, a design house may separate one IC design into several smaller layouts for design parallelism, and those smaller layouts will need to be assembled together to form the original circuit for fabrication.

A layout-versus-layout (LVL) comparison, or layout verification, of two IC layouts is essential to ensure that an original layout of an IC represents the same circuit after it has gone through a modification process to become a second layout. LVL comparison may detect the differences between two layouts, often by performing a Boolean exclusive-or (XOR) operation of the two layouts. Traditionally, performing XOR of two layouts needs to use the EDA tools that created the layout.

With the ever increasing integration of semiconductor systems, IC designs and IC layouts have become increasingly complex. Data files associated with IC layout descriptions have become larger as well. These larger files consume more computing resources and are more difficult to perform XOR of two layouts for LVL comparison. Therefore, there is a need for methods and systems for performing LVL comparison more efficiently.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 2(*a*)-2(*b*) illustrate various exemplary layout samples in cells and layers;

FIGS. 3(*a*)-3(*b*) illustrate a sample method and an example for generating a signature for various basic layout elements;

FIGS. 4(*a*)-4(*b*) illustrate a sample method and an example for generating a signature for a cell;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the embodiments of the present disclosure are discussed in detail below. It should be appreciated, however, that the embodiments of the present disclosure provide many applicable concepts that can be embodied in a wide variety of specific contexts. The specific embodiments discussed are merely illustrative of specific ways to make and use the disclosure, and do not limit the scope of the disclosure.

As will be illustrated in the following, methods of performing layout-versus-layout (LVL) comparison are disclosed. A layout may be in various format such as GDSII or OASIS, for different circuits, and represented by a basic layout element, a cell or a plurality of independent cells in various layers. A basic layout element, a cell, and a layout may have a signature generated according to the embodiment methods. A signature of a first layout may be compared to a signature of a second layout to determine whether the first layout matches the second layout. The signatures of layouts can be generated without the CAD tools creating the layouts. While a layout of a circuit may be of a large size, the signature of a layout may be a number or a plurality of numbers which are of limited sizes. The LVL comparison based on layout signatures may be used by a design house or a fabrication facility.

Figure 1:
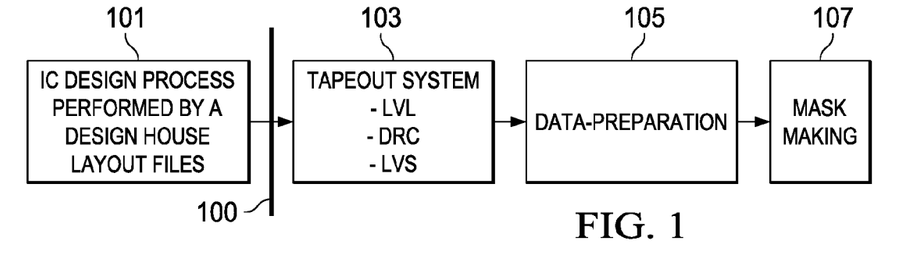
FIG. 1 illustrates an exemplary semiconductor system design and fabrication process.

FIG. 1 illustrates an exemplary design and fabrication chain of an exemplary IC production process. The figure is highly abstract and for illustrative purposes only. The ever increasing complexity of IC systems makes it more beneficial to separate the design of an IC, which is performed by a design house, from the fabrication of an IC, which is performed by a dedicated fab company. The steps shown in FIG. 1, including step 103 tapeout system, step 105 data preparation, and step 107 mask making, are steps performed by a fabrication company, separated by the line 100 from the step 101 performed by a design house. The steps shown are for illustrative purposes and are not limiting. For example, some steps such as design rule check may be performed by both the design house and the fabrication company or fabrication facility.

An IC design process performed by a design house in step 101 shown in FIG. 1 may start with a software description, e.g., in a programming language such as C or VHDL, of the functionality of the circuit. Later, the software description of the design is synthesized to gate-level hardware elements and their interconnections. Next the hardware elements are physically laid out along with descriptions of the interconnections among the elements. Each element may be represented by its layout, as physical arrangements of geometric shapes on a variety of layers to be fabricated on the semiconductor device. Once the layout is finalized, the IC design, including a description of the IC layout, is transferred to an IC fabrication facility for manufacturing of the circuit.

The IC layout defines the specific dimensions of the gates, wells, diffusion areas, oxidation regions, capacitors, contacts, vias, passivation openings, isolation regions, interconnects, and other device elements that form the physical devices. The layout usually represents these shapes with polygons or other geometric shapes, which may be created using CAD systems and tools.

IC layout descriptions can be provided in many different formats. They may be called a layout file, or a layout database. The Graphic Data System II (GDSII) format is a popular format for 2D graphical IC layout data. Other formats include an open source format named Open Access, Milkyway by Synopsys, Inc., Electronic Design Data Model (EDDM) by Mentor Graphics, Inc., and Open Artwork System Interchange Standard (OASIS) proposed by Semiconductor Equipment and Materials International (SEMI). Circuit designs represented using these formats are generally very large.

The tapeout system 103 may be a communication platform between a design house and a fabrication company. Layout files in GDSII or OASIS format, or any other format may be transferred from a design house to a fabrication facility through the tapeout system 103. A layout containing data layers, which correspond to the actual layers to be fabricated in the circuit, will be used to prepare the necessary fabrication data in step 105, and making corresponding masks in step 107. The actual fabrication may be made on a silicon substrate using a photolithographic process, which is not shown, after step 107.

The tapeout system 103 may further perform additional tasks to verify the layout files match the design house description, which may include a layout versus schematic (LVS) check and a design rule check (DRC), respectively, to assure that the spacing, dimensions, and other physical characteristics of the layout comply with predetermined standards. Other checking steps may also be used for layout verification.

A layout-versus-layout (LVL) comparison of two IC layouts is essential to ensure that a first layout of an IC represents a same circuit after it has been modified to become a second layout. A fabrication company may need to perform LVL comparison. For example, LVL comparison may be used as a part of a DRC process for a circuit design, and as a part of the LVS verification. LVL comparison may detect the differences between two layouts, often by performing a Boolean exclusive-or (XOR) operation between the corresponding layers of the two layouts. Traditionally, performing XOR of two layouts required use of the CAD tools that created the layout, and was a slow process. In an embodiment, the LVL comparison may be done by comparing a signature of the layout. The LVL comparison may be performed by the design house in step 101 or by the fabrication company in step 103 as a part of the tapeout system. Using the signature of the layout to perform LVL comparison, the layout may be generated by the design house using one tool and the LVL comparison may be performed by the fabrication company using another tool, which may be a custom made tool by the fabrication facility, without the expensive EDA tool license which may be used by the design house.

Figure 2A:
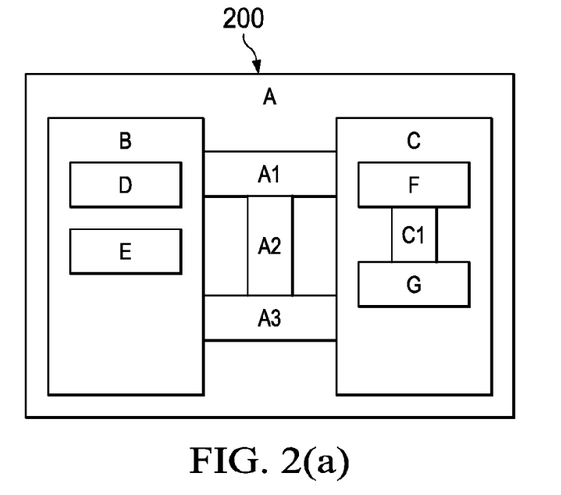

In order to perform LVL comparison, it is important to understand the structure of an IC layout. An IC layout contains cells that define sets of particular devices within the circuit. In general, the overall IC design may be viewed as the top level cell in a hierarchy of cells that comprise other nested cells, sub-cells, or component cells. However, a layout may contain two cells, one of which is not a sub-cell or a component of the other cell, in which case they may be called two independent cells. FIG. 2(a) illustrates a greatly simplified layout diagram of a semiconductor device with a hierarchical cell of a layout file or a layout database 200. FIG. 2(a) illustrates only a few levels of a hierarchy. An actual layout database may be much more complex. FIG. 2(a) may be any levels of the overall database.

Cells in FIG. 2(a) may be described in terms of a cell name and a placement or location within another cell. Top level cell A includes cell B and cell C placed within the cell. Top level cell A also includes other basic layout elements such as A1, A2, and A3 defined at specific layers. Cell B at the second level includes cells D and E. Cell C is also at the second level of the hierarchy and contains cells F and G, and a basic layout element C1. Details of cell D, E, F, and G are not shown, which may contain other component cells or may be basic layout elements.

A cell may refer to the top level cell of the hierarchy, or any other sub-cell or nested cell, a component cell of the top level cell, or a basic layout element. A cell containing no other cells or components may be called as a basic layout element. A cell is a hierarchical cell if it is not a basic layout element. A cell, which may be cell A, B, C, or any others, as shown in FIG. 2(a), may be one layer of the IC or a portion of the layer. A cell may be a structure formed by smaller structure situated in multiple layers of the circuit. A cell may perform a particular function, such as a memory, latch, flip-flop, or logic function. A cell may be identified by coordinates of where the cell is located. The placement of the cell may be defined globally within a global coordinate system for the layout, or may be defined locally as a placement within the parent cell. A cell may also be described in terms of its orientation. A cell may be placed or located with different orientations, which also referred to as angles of rotation or transformations.

Figure 2B:
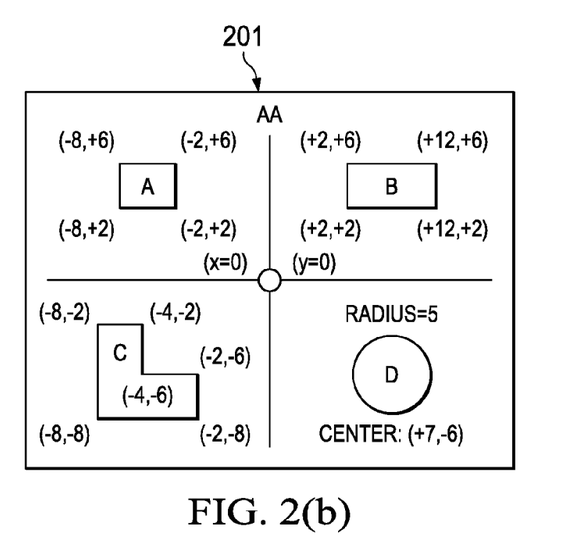

FIG. 2(b) illustrates a few exemplary basic layout elements that may be contained in a cell 201, which is named as cell AA. The cell 201 may contain a few component cells A, B, C, and D, where each is a basic layout element that contains no other components. The basic layout elements may be polygons, paths or poly-lines, trapezoids, circles and textboxes, or other geometrical objects. The basic layout elements in FIG. 2(b) are identified by a global coordinate system for the layout. The basic layout elements may be identified in other ways, such as defined locally as a placement within the parent cell. Each basic layout element may be described by its trace with respect to the coordinate system. A trace is a description that can uniquely identify a basic layout element and its location.

As illustrated in FIG. 2(b), rectangles A and B may be described in terms of their width, height and location or placement within a cell, which may form its trace. The location or placement of a rectangle may be described in terms of an x coordinate and a y coordinate of the lower left corner of the rectangle. For example, the rectangle A may be described by its lower left corner (−8, +2), together with a height of 4, and a width of 6. Similarly, the rectangle B may be described by its lower left corner (+2, +2), together with a height of 4, and a width of 10.

Other polygons such as C in FIG. 2(b) may be described in terms of an x coordinate and a y coordinate of a point of origin vertex. Any one of the multiple vertices of a polygon may be chosen to be its point of origin. A polygon of n sides needs a description of n vertices. The polygon edges need not lie on a vertical or horizontal line. A polygon may be described as a trace of the coordinate points making up a path around the polygon. For example, the polygon C in FIG. 2(b) may correspond to the trace of −8−8−8−2−4−2−4−6−2−6−2−8. The trace of the polygon C may be formed by starting at the lower left coordinate and moving clockwise around the polygon shape. Other forms of trace may be formed to start at a different point of origin or go counterclockwise. Polygons may be defined as having round or curved shapes or edges.

Circles may be described in terms of a radius value and an x coordinate and a y coordinate location for the center of the circle, which form its trace. For example, the circle D in FIG. 2(b) may be described by the center coordinate (+7, −6) in addition to the radius 5. The trace of the circle may only be its center if the radius 5 is recorded in some other way.

Lines connecting individual instances of elements of an IC layout are referred to as paths, poly lines or fat lines. Such paths are described much like a polygon geometrical unit.

Any other elements of an IC layout can be described by its trace. For instance, text annotations can also be part of an IC layout. Text units are typically described in terms of a text string value and a placement or location information in terms of an x coordinate and a y coordinate.

FIGS. 3(a)-3(b), FIGS. 4(a)-4(b), and FIG. 5 illustrate an exemplary method of performing LVL comparison in an efficient way by using a signature of a layout and its components. LVL comparison of two IC layouts is essential to ensure that an original layout of an IC represents the same circuit after it has been modified to become a second layout. With the ever increasing integration of semiconductor systems, IC designs and associated IC layouts have become increasingly complex. Data files associated with IC layout descriptions become larger as well. These larger files consume more computing resources and are more difficult to perform XOR of two layouts for LVL comparison.

Figure 3A:
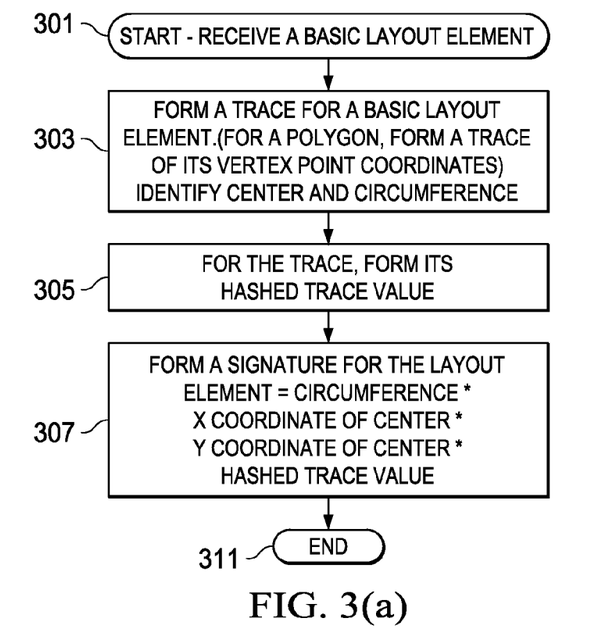
Figure 3B:
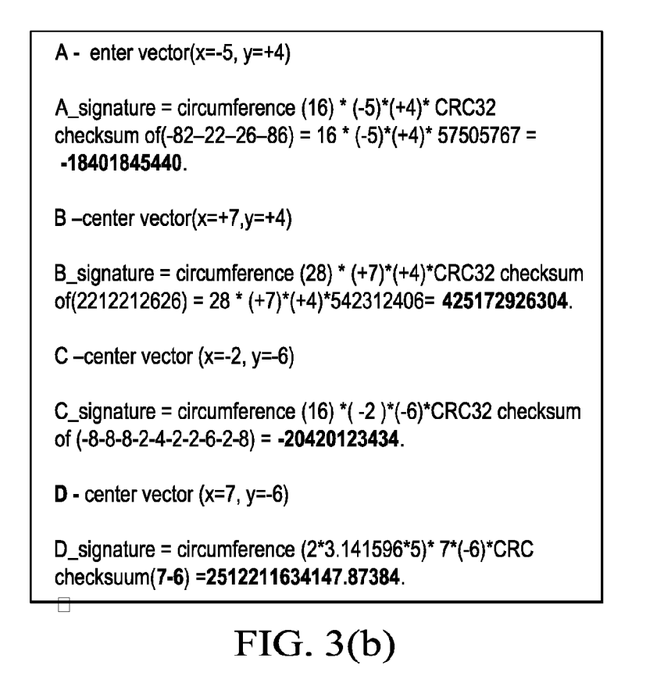
Figure 4A:
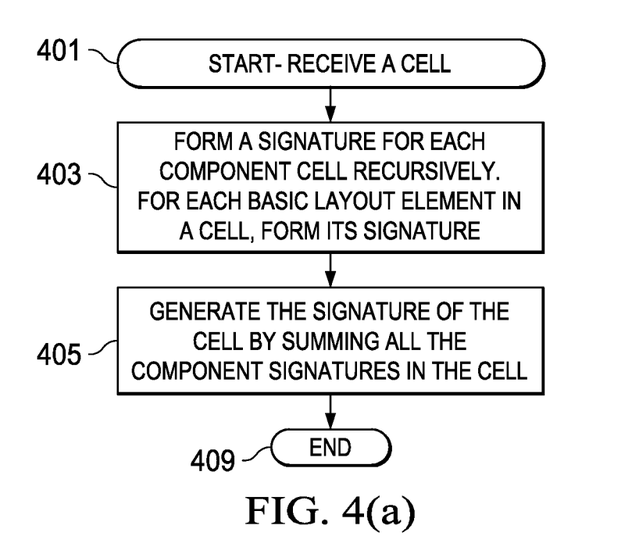
Figure 4B:
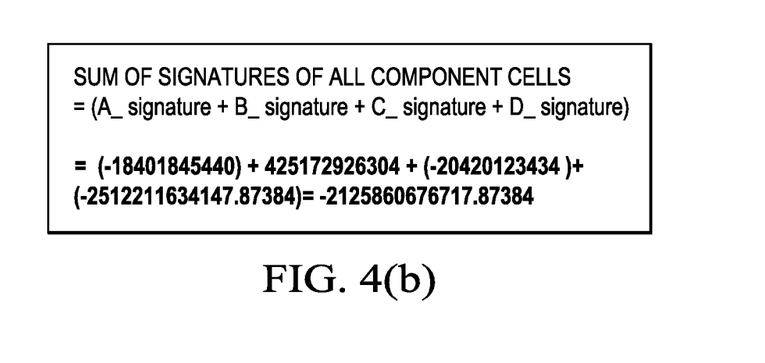
Figure 5:
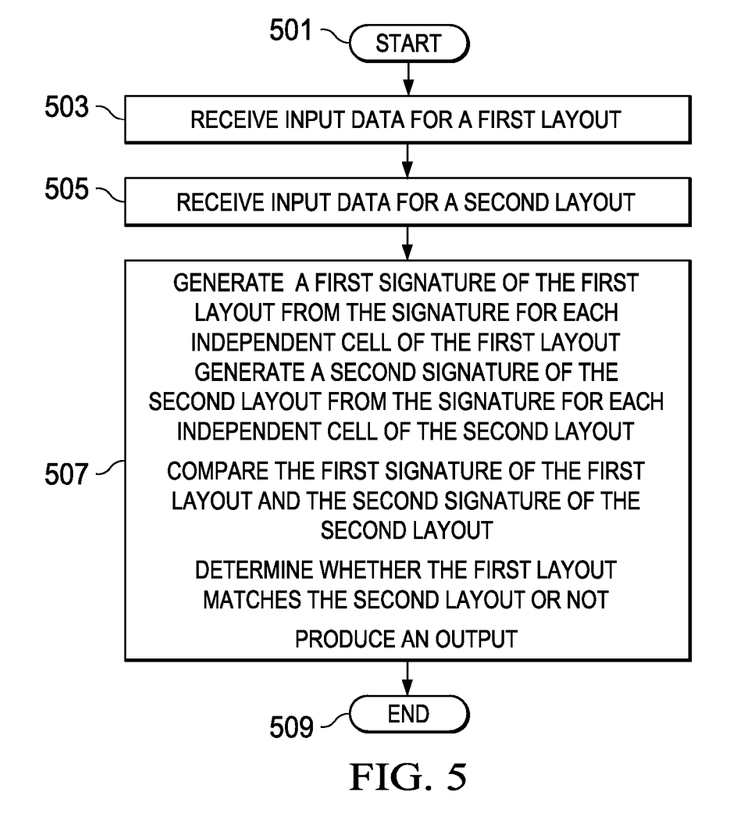
FIG. 5 illustrates an exemplary method for layout-versus-layout (LVL) comparison based on the signatures of layouts.

A signature for a basic layout element may be generated as illustrated in FIGS. 3(a)-3(b), based on a trace of the basic layout element. A signature for a hierarchical cell is generated based on the signature of the basic layout elements of the cell, and signatures of its component cells, as illustrated in FIGS. 4(a)-4(b). Two layouts are compared by comparing their respective signatures as illustrated in FIG. 5. The method may be applied to any two possibly matching layouts, or sometimes one layout may be a layout of a master cell which is an approved design.

As illustrated in FIG. 3(a), for a basic layout element such as a polygon or any other shape, a signature is generated. The method for generating a signature of a basic layout element starts at step 301, where the description of the basic layout element is received as an input. In step 303, a trace for the basic layout element is generated. A trace is a description that can uniquely identify a basic layout element and its location. The trace may be a string formed by a plurality of numbers. For example, for the polygon A of FIG. 2(b), the trace of the vertex coordinate is generated as (−82−22−26−86). The trace starts from the lower left corner of the polygon and goes clockwise direction. There may be a different trace if it starts from a different vertex of origin. However, once the vertex of origin is fixed, the trace is fixed and unique as well. For a circle D of FIG. 2(b), the trace may just be the center of the circle, which is 7−6. The trace may be received together with the description of the layout as well, instead of generated in step 303.

The center vector and the circumference for the basic layout element are identified as well in step 303. For example, the rectangle A of FIG. 2(b) has a circumference 16, and its center vector has the coordinate as (x=−5, y=+4). Similarly, for the rectangle B, its center is (x=+7,y=+4); for the polygon C, its center is (x=−2, y=−6); and for the circle D, its center is (x=7, y=−6). Moreover, rectangle A, B, polygon C, and circle D have circumference as 16, 28, 16, and (2*3.141596*5), respectively.

In step 305, a hashed trace value is formed. The trace of a rectangle or a polygon may be a long string of data. The hashed trace value may be a shorter value. The hashed trace value is generated by a hashing method such as the CRC32 checksum method used in error correction code. A cyclic redundancy check (CRC) is an error-detecting code commonly used in digital networks and storage devices to detect accidental changes to raw data. Blocks of data entering these systems get a short check value attached, based on the remainder of a polynomial division of their contents. Specification of a CRC code requires definition of a so-called generator polynomial. The most commonly used polynomial lengths are 9 bits (CRC8), 17 bits (CRC16), 33 bits (CRC32), and 65 bits (CRC64). CRC32 checksum is illustrated in FIG. 3(b) for the traces of the polygons A, B, C, and circle D. However, many other CRC methods and other hashing methods in general can be used in place of CRC32 checksum.

In step 307, a signature for the basic layout element is formed, which may be defined as the product of circumference*x coordinate of center*y coordinate of center*hashed trace value. The formula used here may be for illustrative purposes and are not limiting. For example, the signature may be formed by a different formula such as circumference^2*x coordinate of center*y coordinate of center*hashed trace value. The signature may be formed directly on the trace of the basic element, without the center vector and the circumference.

As illustrated in FIG. 3(b), the center vector of A is (x=−5, y=+4). The signature of the rectangle A is calculated as A_signature=circumference (16)*(−5)*(4)*CRC32 checksum of(−82−22−26−86)=16*(−5)*(+4)*57505767= −18401845440. Similarly, the center vector of D is (x=−5, y=+4), the signature of the circle D is calculated as D_signature=circumference (2*3.141596*5)*7*(−6)*CRC checksum(7−6)=2512211634147.87384. The signature of rectangle B is calculated as B_signature=circumference (28) *7*4*CRC32 checksum of(2212212626)=28*(+7)*(+4) *542312406=425172926304, and the signature of the polygon C is calculated as C_signature=circumference (16)*(−2) *(−6)*CRC32 checksum of (−8−8−8−2−4−2−2−6−2−8)= −20420123434.

The signature of a basic layout element illustrated above may be just for illustrative purpose only and is not limiting. For example, a signature may be formed by a plurality of numbers such as (s1, s2), where s1 is formed as above, and s2 may be another parameter formed in a different way. The signatures may be generated in different sequences as well. For example, the center and the circumference of the basic layout element may be generated in step 307 instead of step 303.

FIG. 4(a) illustrates an exemplary method for generating a signature for a hierarchical cell. The method starts at step 401, where the description of the cell is received as an input.

In step 403, the method generates a signature for each component cell recursively. A component cell may be a cell, a sub-cell, or a basic layout element. If the component cell is a basic layout element in a cell, the method generates its signature as illustrated in FIG. 3(a). If the component cell is a hierarchical cell itself, the method can generate a signature recursively.

In step 405, the signature of the cell is generated by adding signatures of all the component cells of the cell. An example is shown in FIG. 4(b), where the signature of the cell 201 shown in FIG. 2(b) is the sum of signatures of all the component cells of the cell, which equals to (A_signature+B_signature+C_signature+D_signature)=(−18401845440)+ 425172926304 +(−20420123434)+ (−2512211634147.87384)=−2125860676717.87384. By generating the signature of the cell, the complex cell layout is reduced to a simple number representation, which makes the LVL comparison much easier. The method stops at step 409.

FIG. 5 illustrates an exemplary method for performing LVL comparison based on signatures of layouts. The method starts at step 501. At step 503, it receives input data for a first layout. At step 505, it receives input data for a second layout. The input data can be in any of the format such as GDSII, OpenAccess, Milkyway, EDDM, or OASIS. The input layout data may be a structured data contains a hierarchical cell, or a basic layout element. The input data may be a plurality of independent cells in a layer or in multiple layers.

In step 507, the method generates the signature for each independent cell of a first layout. The signature for each independent cell may be generated by the method illustrated in FIG. 4(*a*) if the cell is a hierarchical cell, or by the method illustrated in FIG. 3(*a*) if the cell is a basic layout element. The signature of the first layout may be the sum of all the independent top level cells of the layout. Alternatively, the signature of the first layout may be represented by the array of the signatures of each independent cell of the first layout.

Similarly, the method generates the signature for each independent cell of a second layout. The signature for each independent cell may be generated by the method illustrated in FIG. 4(*a*) if the cell is a hierarchical cell, or by the method illustrated in FIG. 3(*a*) if the cell is a basic layout element. The signature of the second layout may be the sum of all the independent cells of the layout. Alternatively, the signature of the second layout may be represented by the array of the signatures of each independent cell of the second layout.

The method then compares the signatures of the two layouts and determines whether they have the same signature. If the first layout and the second layout have the same signature, then the two layouts are a match, representing a same circuit. The method further produces an output to indicate the comparison result. The output may be a simple yes or no result, or the output may indicate more information as how many of the independent cells are matched in the first layout and the second layout.

After the LVL comparison has been performed and verified the first layout is the same as the second layout, the layout containing data layers, which correspond to the actual layers to be fabricated in the circuit, will be used to prepare the necessary fabrication data, and making corresponding masks. The actual fabrication may be made on a silicon substrate using a photolithographic process, according to the masks prepared.

In the comparison process, a cell may be compared at a variety of different orientations from a given origin point, for example, in a first orientation, rotated 90° from the first orientation (clockwise), rotated −90° from the first orientation (counterclockwise), rotated 180° from the first orientation, in a mirrored orientation. Each orientation generates a different trace and therefore a different signature value.

In the comparison process, a cell may be compared first using some general heuristic. For example, there may be two independent cells at the top level of the layout, or there are total 10 polygons in the layout.

Partial comparison may be performed. For example, if a first layout contains two independent cells and is compared with a second layout with two independent cells, it may be possible that the second independent cell of the first layout does not match the second independent cell of the second layout, but the first independent cell of the first layout matches the first independent cell of the second layout. The signature of the first independent cell of the first layout can be compared with the signature of the first independent cell of the second layout to make such a determination.

While the above description generally describes finding an exact match between the master cell layout and a desired device cell layout, however, that if desired, any level of tolerance may be used in the system.

Figure 6:
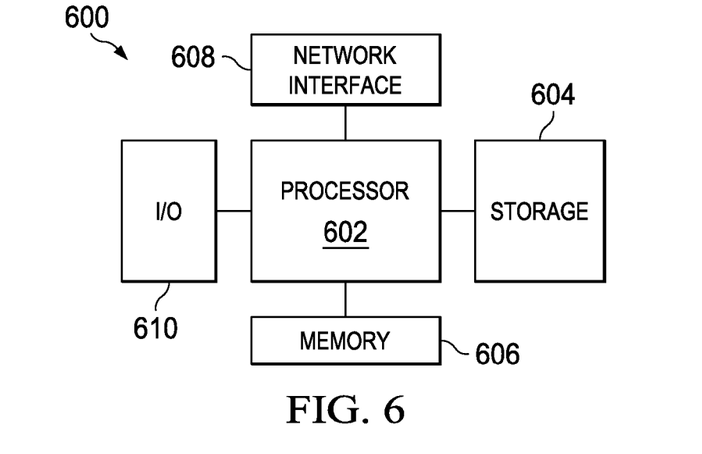
FIG. 6 illustrates an exemplary embodiment for a LVL system.

The methods described herein can be implemented in software stored on a computer-readable medium and executed on a computer. Some of the disclosed methods, for example, can be implemented as part of an EDA or CAD tool. Such methods can be executed on a single computer or a networked computer. FIG. 6 illustrates such a computer system for implementing the methods.

The unit 600 may contain a processor 602 that controls the overall operation of the controller 600 by executing computer program instructions which define such operation. Processor 602 may include one or more central processing units, read only memory (ROM) devices and/or random access memory (RAM) devices. The processor 602 may be an ASIC, a general purpose processor, a Digital Signal Processor, a combination of processors, a processor with dedicated circuitry, dedicated circuitry functioning as a processor, and a combination thereof.

The computer program instructions may be stored in a storage device 604 (e.g., magnetic disk, database, etc.) and loaded into memory 606 when execution of the computer program instructions is desired. Thus, applications for performing the herein-described method steps can be defined by the computer program instructions stored in the memory 606 or storage 604 and controlled by the processor 602 executing the computer program instructions.

In alternative embodiments, hard-wired circuitry or integrated circuits may be used in place of, or in combination with, software instructions for implementation of the processes of the present invention. Thus, embodiments of the present invention are not limited to any specific combination of hardware, firmware, or software. The memory 606 may store the software for the controller 600, which may be adapted to execute the software program and thereby operate in accordance with the present invention and particularly in accordance with the methods described in detail above. However, the invention as described herein could be implemented in many different ways using a wide range of programming techniques as well as general purpose hardware sub-systems or dedicated controllers.

The unit 600 may also include one or more network interfaces 608 for communicating with other devices via a network. In wireless portions of the network, the network interface could include an antenna and associated processing. In wired portions of the network, the network interface could include connections to the cables that connect the unit to other units. In either case, the network interface could be thought of as circuitry for accessing the physical communications portions (such as the antenna).

The unit 600 could also include input/output devices 610 (e.g., display, keyboard, mouse, speakers, buttons, etc.) that enable user interaction with the controller 600. These user I/O devices are optional and not needed if the unit 600 is accessed by the network interfaces only.

An implementation of unit 600 could contain other components as well, and that the controller of FIG. 6 is a high level representation of some of the components of such a controller for illustrative purposes.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method performed by a computer for comparing a first layout with a second layout, comprising:
   receiving, by an input device of a computer, a first input corresponding to a first layout of an integrated circuit (IC), wherein the first layout comprises a first basic layout element;
   receiving, by the input device of the computer, a second input corresponding to a second layout of the IC, wherein the second layout comprises a second basic layout element;
   forming, by a processor of the computer, a first trace of the first basic layout element, and a second trace of the second basic layout element, wherein the first trace is a first description that uniquely identifies the first basic layout element and its location, and the second trace is a second description that uniquely identifies the second basic layout element and its location;
   generating, by the processor of the computer, a first trace signature using at least a hashed trace value of the first trace and a circumference of the first basic layout element, the first trace signature identifying the first basic layout element;
   generating, by the processor of the computer, a first input signature from at least the first trace signature, the first input signature identifying the first input;
   generating, by the processor of the computer, a second trace signature using at least a hashed trace value of the second trace and a circumference of the second basic layout element, the second trace signature identifying the second basic layout element;
   generating, by the processor of the computer, a second input signature from at least the second trace signature, the second input signature identifying the second input;
   comparing, by the processor of the computer, the first input signature and the second input signature to determine whether the first layout is same as the second layout; and
   producing, by an output device of the computer, an output.

2. The method of claim 1, wherein the first input signature is generated by a different computer aided design (CAD) tool from a tool used to create the first layout.

3. The method of claim 1, wherein generating the first trace signature comprises:
   forming the hashed trace value of the first trace of the first basic layout element; and
   forming the first trace signature of the first basic layout element based on the hashed trace value and a value of the first trace other than the hashed trace value.

4. The method of claim 1, wherein the first trace signature for the first basic layout element is generated from a first orientation, and the second trace signature for the second basic layout element is generated from a second orientation.

5. The method of claim 1, wherein the first basic layout element is a polygon and the first trace of the first basic layout element is formed by connecting an x coordinate and a y coordinate of a plurality of vertexes of the polygon along edges of the polygon to form a string.

6. The method of claim 1, wherein the first basic layout element is a circle and the first trace of the first basic layout element is formed by connecting an x coordinate and a y coordinate of a center of the circle.

7. The method of claim 1, wherein the hashed trace value of the first trace is generated by a hash function applied to the first trace.

8. The method of claim 7, wherein the hash function is a cyclic redundancy check (CRC) code.

9. The method of claim 8, wherein the CRC code is a CRC32 code.

10. The method of claim 1, wherein the first trace signature of the first basic layout element is formed by a formula selected from a group consisting essentially of: the circumference of the first basic layout element * an x coordinate of a center of the first basic layout element * a y coordinate of the center of the first basic layout element * the hashed trace value of the first trace; or the circumference^2 of the first basic layout element * the x coordinate of the center of the first basic layout element * the y coordinate of the center of the first basic layout element * the hashed trace value of the first trace.

11. The method of claim 1, wherein the first trace signature of the first basic layout element is formed as a plurality of numbers each of which is generated by a formula selected from a group consisting essentially of: the circumference of the first basic layout element * an x coordinate of a center of the first basic layout element * a y coordinate of the center of the first basic layout element * the hashed trace value of the first trace; or the circumference^2 of the first basic layout element * the x coordinate of the center of the first basic layout element * the y coordinate of the center of the first basic layout element * the hashed trace value of the first trace.

12. The method of claim 1, further comprising:
    receiving the first input corresponding to the first layout, wherein the first layout comprises a hierarchical cell;
    generating a first signature for the hierarchical cell comprising:
      generating a signature of a component cell of the hierarchical cell, which is a basic layout element, by forming a trace of the component cell, forming a hashed trace value of the trace of the component cell, and forming a component trace signature of the component cell based on the trace of the component cell;
      generating a signature of a hierarchical component cell recursively; and
      adding all signatures of all component cells of the hierarchical cell to be the first signature for the hierarchical cell.

13. The method of claim 1, wherein the first layout comprises a plurality of independent cells, and generating the first input signature comprises:
    generating a signature for each independent cell of the first layout; and
    generating the first input signature based on the signature for each independent cell.

14. The method of claim 13, wherein the first input signature is generated by adding the signature of each independent cell.

15. The method of claim 13, wherein the first input signature is generated by forming an array of signatures for all independent cells of the first layout.

16. A system performing a layout-versus-layout (LVL) comparison, comprising:
an input device to receive a first layout and a second layout, wherein the first layout comprises a first basic layout element, and the second layout comprises a second basic layout element;
a processor that is configured to:
form a first trace of the first basic layout element, and a second trace of the second basic layout element, wherein the first trace is a first description that uniquely identifies the first basic layout element and its location, and the second trace is a second description that uniquely identifies the second basic layout element and its location;
generate a first trace signature of the first basic layout element from at least a first hashed trace value of the first trace and an x coordinate and a y coordinate of a center of the first basic layout element, the first trace signature uniquely identifying the first basic layout element;
generate a second trace signature of the second basic layout element from at least a second hashed trace value of the second trace and an x coordinate and a y coordinate of a center of the second basic layout element, the second trace signature uniquely identifying the second basic layout element;
generate a first signature for the first layout from at least the first trace signature;
generate a second signature for the second layout from at least the second trace signature;
compare the first signature and the second signature to determine whether the first layout is same as the second layout; and
produce an output, wherein the first signature and the second signature are a number or a plurality of numbers.

17. The system of claim 16, wherein the first basic layout element is a circle, and the processor generates the first trace signature based on values of a center and a circumference of the circle, and a hashed trace value generated by a hash function applied to a trace of the circle.

18. The system of claim 16, wherein the first layout comprises a hierarchical cell having component cells each having at least one basic layout element, and wherein the processor is further configured to generate the first signature by adding a signature of each of the component cells; and wherein the processor if further configured to recursively generate each signature of the hierarchical cell.

19. The system of claim 16, wherein the first layout comprises a plurality of independent cells, and the processor generates the first signature related to a signature for each independent cell of the first layout.

20. A computer system having a non-transitory, tangible, computer readable medium having instructions for causing the computer system to perform a method comprising:
receiving, by an input device of the computer, a first input representing a first layout of an integrated circuit (IC) and a second input representing a second layout of the IC, the first layout having a plurality of first cells each having at least one first basic layout element, the second layout having a plurality of second cells each having at least one second basic layout element;
forming, by a processor of the computer, a plurality of first traces, each of the plurality of first traces describing a layout and location of the at least one first basic layout element of a respective first cell;
forming, by a processor of the computer, a plurality of second traces, each of the plurality of second traces describing a layout and location of the at least one second basic layout element of a respective second cell;
generating, by the processor of the computer, a plurality of first trace signatures, each of the plurality of first trace signatures generated from at least a hashed trace value of a corresponding first trace of a corresponding first basic layout element and a circumference of the corresponding first basic layout element, each of the plurality of first trace signatures identifying and describing the corresponding first basic layout element;
generating, by the processor of the computer, a plurality of second trace signatures, each of the plurality of second trace signatures generated from at least a hashed trace value of a corresponding second trace of a corresponding second basic layout element and a circumference of the corresponding second basic layout element, each of the plurality of second trace signatures identifying and describing the corresponding second basic layout element;
generating, by the processor of the computer, a plurality of first cell signatures using at least the plurality of first trace signatures, each of the plurality of first cell signatures generated from a first trace signature corresponding to the at least one first basic layout element of a respective one of the plurality of first cells;
generating, by the processor of the computer, a plurality of second cell signatures using at least the plurality of second trace signatures, each of the plurality of second cell signatures generated from a second trace signature corresponding to the at least one second basic layout element of a respective one of the plurality of second cells;
generating, by the processor of the computer, a first input signature from at least the plurality of first cell signatures, the first input signature identifying the first input;
generating, by the processor of the computer, a second input signature from at least the plurality of second cell signatures, the second input signature identifying the second input;
comparing, by the processor of the computer, the first input signature and the second input signature to determine whether the first layout is same as the second layout;
comparing, by the processor of the computer, when the first input signature does not match the second input signature, each of the plurality of first cell signatures to respective ones of the plurality of second cell signatures to determine which cell signatures do not match; and
producing, by an output device of the computer, an output.

* * * * *